United States Patent [19]

Cho et al.

[11] Patent Number: 5,862,349
[45] Date of Patent: Jan. 19, 1999

[54] METHOD AND APPARATUS FOR DOCKING AND UNDOCKING A NOTEBOOK COMPUTER

[75] Inventors: Sung-Soo Cho, Sunnyvale; Diane M. Bryant, San Jose; James P. Kardach, Saratoga; Feng Deng, San Jose, all of Calif.

[73] Assignee: Intel Corporation, Santa Clara, Calif.

[21] Appl. No.: 754,400

[22] Filed: Nov. 21, 1996

[51] Int. Cl.⁶ ..................................... G06F 1/13
[52] U.S. Cl. .......................... 395/283; 395/281; 395/282
[58] Field of Search ................. 395/281–283, 395/306, 308, 309, 284, 285, 290, 733, 741, 681

[56] References Cited

U.S. PATENT DOCUMENTS

| | | | |
|---|---|---|---|
| 5,302,947 | 4/1994 | Fuller et al. | 340/825.34 |
| 5,323,291 | 6/1994 | Boyle et al. | 361/683 |
| 5,347,425 | 9/1994 | Herron et al. | 361/683 |
| 5,386,567 | 1/1995 | Lien et al. | 395/700 |
| 5,463,742 | 10/1995 | Kobayashi | 395/281 |
| 5,488,572 | 1/1996 | Belmont | 364/514 R |
| 5,526,493 | 6/1996 | Shu | 395/281 |
| 5,596,728 | 1/1997 | Belmont | 395/281 |
| 5,598,537 | 1/1997 | Swanstrom et al. | 395/281 |
| 5,642,517 | 6/1997 | Shirota | 395/750 |
| 5,754,797 | 5/1998 | Takhashi | 395/283 |
| 5,768,541 | 6/1998 | Pan-Ratzlaff | 395/283 |
| 5,784,576 | 7/1998 | Guthrie et al. | 395/283 |

Primary Examiner—Meng-Ai T. An
Assistant Examiner—Raymond N. Phan
Attorney, Agent, or Firm—Blakely, Sokoloff, Taylor & Zafman LLP

[57] ABSTRACT

Prior art quiet docking and undocking methods used an interface that was located within the notebook computer, thus adding to the cost, complexity, weight, and power consumption of the notebook computer. The present invention provides for an apparatus for quiet docking of a notebook computer to a docking station, including interface circuitry located within the docking station. The interface detects when the notebook computer has been inserted within the docking station, and correspondingly enables a switch such that a common system bus is coupled between the notebook computer and the docking station. The interface also generates events to allow a software routine to configure the notebook computer and docking station without prior user intervention. The interface also includes circuitry to detect an undock request, and correspondingly undock the computer such that a transaction occurring on the system bus is not affected.

16 Claims, 8 Drawing Sheets

METHOD AND APPARATUS FOR DOCKING AND UNDOCKING A NOTEBOOK COMPUTER

CROSS-REFERENCE TO RELATED APPLICATIONS

This application is related to U.S. patent application Ser. No. 08/580,933, filed Dec. 29, 1995, entitled "METHOD AND APPARATUS FOR DOCKING AND UNDOCKING A NOTEBOOK COMPUTER," by Cho et al, filed on even date herewith.

FIELD OF THE INVENTION

This invention relates to the field of computer systems. More particularly, this invention relates to the docking and undocking of a notebook computer from a docking station.

BACKGROUND OF THE INVENTION

Today, notebook (mobile) computers have incorporated many features that were once only available on desktop personal computers. Through the use of a docking station connected to a notebook computer, a user is allowed to access various services usually only available to desktop computers. Thus, when a notebook computer is connected to, or seated in, a docking station, the resulting system resembles a desktop computer.

A notebook computer is typically connected to a docking station through the use of a socket type connection. That is, the notebook computer is inserted into the docking station, and upon such insertion, connects through the use of a mating connector to the docking station. When disengaging the notebook computer from the docking station, the notebook computer is simply removed from the docking station.

One of the major problems with prior art methods of inserting and removing the notebook computer from the docking station is that the user must manually intervene before either the insertion or removal process can be performed.

Therefore, another prior art docking and undocking method uses circuitry that allows a user to insert and remove a notebook computer from a docking station without preconditioning by the user. Thus, even if an application program is running on the notebook computer, the notebook computer can be inserted or removed from the docking station without interruption of the application program.

This prior art system employs an interface, including a docking chip, that resides within the notebook computer that handles insertion and removal algorithms. While this prior art system is advantageous in that it allows docking and undocking without preconditioning, it has the disadvantage of complicating the notebook computer with more circuit components. The more circuit components included within the notebook computer, the higher drain there will be on the battery, the more expensive the notebook is to manufacture, and the larger the notebook computer will become.

SUMMARY OF THE INVENTION

A method and apparatus for providing docking of a notebook computer to a docking station without preconditioning is described. The apparatus includes interface circuitry located within the docking station for interfacing between the notebook computer and docking station. The interface detects when the notebook computer has been inserted within the docking station, and correspondingly enables a switch such that a common system bus is coupled between the notebook computer and the docking station. The interface also generates events to allow software to configure the notebook computer and docking station without prior user intervention.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for docking and undocking a notebook computer is described. In the following detailed description of the present invention numerous specific details are set forth, such as specific bus protocols, voltages, event and interrupt names, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Overview of the Invention

The present invention provides an automatic, un-preconditioned insertion/removal protocol between a notebook computer and a docking station that does not require user intervention. Moreover, the present invention is advantageous in that a the docking interface is located within the docking station, rather than within the notebook computer.

When inserted within the docking station, the notebook computer is coupled to the docking station through a connector. The connector includes pins that couple common signal lines between the notebook computer and docking station. For instance, the connector is used to connect a common system bus between the notebook computer and the docking station.

The common system bus is also coupled to a switch. The switch is controlled by the interface circuitry within the docking station. When the interface circuitry detects that the notebook computer has been inserted within the docking station, the switch is closed to couple the common system bus of the notebook computer with the docking station. However, because a transaction may be in progress on the common system bus, the switch is not closed until the interface circuitry determines that it is safe to do so without interrupting the transaction. The interface circuitry therefore requests control of the common system bus, and then closes the switch once control has been granted to the interface circuitry.

For one embodiment of the invention, the interface circuitry generates a docking event once the switch has been closed. The event is detected by a software routine that configures the notebook computer and docking station automatically, without prior user intervention. For instance, the software routine may load required device drivers for devices within the docking station that are coupled to the common system bus.

When the notebook computer is inserted within the docking station, the notebook computer may be in a suspend mode or a normal mode. For one embodiment of the invention, the interface circuitry checks the mode of the notebook computer upon insertion. If the notebook is in a suspend mode, the interface circuitry resumes the notebook computer to normal mode before closing the switch and generating the docking event.

Once the notebook computer is docked to the docking station, the notebook computer may enter suspend mode. For one embodiment, the interface circuitry detects that the notebook is entering suspend mode, and thereby places the docking station in suspend mode as well.

The interface circuitry also detects when the notebook computer is being removed from the docking station. The interface circuitry detects a removal by either sensing a physical removal of the notebook computer from the docking station, or receiving an eject request from the user of the system or from a software routine. In response to the removal, the interface circuitry first generates an undock event that causes the software to prepare the computer system for removal of the notebook computer. The interface circuitry then opens the switch to isolate the common system bus.

The notebook computer may be in suspend mode or normal mode when an eject request is detected by the interface circuitry. For one embodiment, if the notebook computer is in suspend mode when the eject request is detected, the interface circuitry resumes the notebook computer to normal mode before generating the undock event and opening the switch.

When the undock event is detected by a software routine, the software routine configures the notebook computer and docking station in preparation for removal of the notebook computer. Recall that events, such as the undock event, are generated by the interface circuitry to allow a software routine to configure the notebook computer and docking station upon insertion or removal. These events are generated automatically by interface circuitry within the docking station. Therefore, the user does not have to manually intervene before the commencement of docking or undocking.

Because a transaction may be in progress on the common system bus when removal is detected, the interface circuitry opens the switch at a time when a change in capacitance of the common system bus does not affect the transaction. The interface circuitry opens the switch at a time between the rising edge of one system bus clock and the setup time of the next system bus clock. Therefore, if any signals on the common system bus fluctuate due to the opening of the switch, the signals will be settled by the setup time of the next clock.

The present invention automatically detects conditions, or states, of the notebook computer and the docking station to automatically control the power of the notebook computer or the docking station, to generate events for system software interaction, to automatically isolate and enable interconnect signals during the insertion or removal process or while the notebook computer is fully seated to prevent interconnect signals from conflicting, and locates and allocates resources.

Note that the software routines referred to in the present invention control the operation of hardware in the computer system and may be implemented in various programming languages. For instance, the software routines may comprise a basic input/output system (BIOS) written in assembly language. Also the software may be implemented, in full or in part, as firmware, runtime library routines, or operating system procedures.

Detailed Description of the Apparatus of the Present Invention

Figure 1:
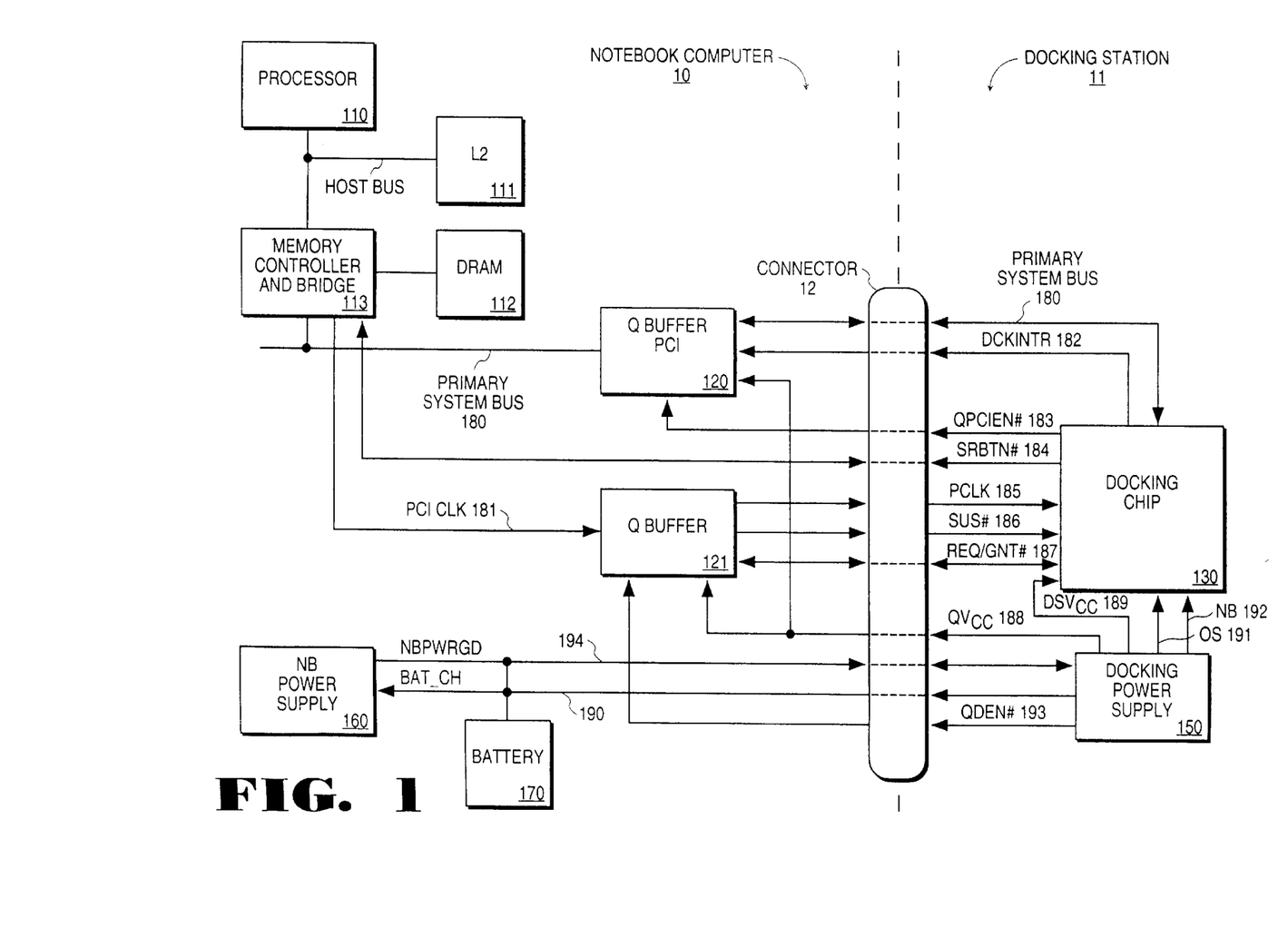
FIG. 1 is a block diagram of a notebook computer and docking station of the present invention.

FIG. 1 is a block diagram of one embodiment of the system of the present invention. Referring to FIG. 1, the system includes a docking station 11 and a notebook computer 10, each shown separated by a dotted line. A connector 12 is positioned between the notebook computer 10 and docking station 11 to facilitate an electrical connection of signals between the two. When the notebook computer 10 is properly coupled to the mating connector 12 of the docking station 11, the notebook computer is said to be "seated" within the docking station.

For the illustrated embodiment, notebook computer 10 comprises a microprocessor 110 coupled to a second level (L2) cache 111. The microprocessor communicates with memory (DRAM) 112 and system bus 180 through a memory controller and bridge chip 113. For one embodiment, microprocessor 110 comprises an Intel Architecture Microprocessor (e.g., i486 or Pentium® processor) manufactured by Intel Corporation of Santa Clara, Calif. For the embodiment described herein, system bus 180 is a bus conforming to the peripheral component interconnect (PCI) protocol. Alternatively, system bus 180 may conform to another well-known protocol, such as the industry standard architecture (ISA) bus.

The notebook computer 10 may also comprise an I/O controller (not shown), coupled to the system bus 180, including parallel ports, dual serial ports, real-time clock unit, dual programmable interrupt controller, DMA controllers, memory mapper and I/O buffers. Moreover, notebook computer 10 may also comprise a graphics controller and video frame buffer (not shown), coupled to the PCI bus 180, for interfacing with a flat panel display or CRT. Also coupled to PCI bus 180 in one embodiment are a hard disk, floppy disk drive, keyboard and BIOS controller, all of which are well-known and not shown.

The PCI clock signal line 181 is coupled from the memory controller and bridge chip 113 to Q-buffer 121. Moreover, the PCI request and grant signal pair lines REQ/GNT# 187 are routed through the Q-buffer 121. The Q-buffer 121 is enabled by the Q-buffer enable signal QDEN#, delivered to the Q-buffer 121 on signal line 193 and generated by the docking power supply circuitry 150. The PCI bus 180 is coupled to the Q-buffer 120, which is enabled by the Q-buffer enable signal QPCIEN# on signal line 183, generated by the docking chip 130.

The Q-buffers 120 and 121 provide buffering of common signals between notebook computer 10 and docking station 11 when enabled. Q-buffers 120 and 121 also provide isolation between the common signals of notebook computer 10 and docking station 11 when disabled. For one embodiment, Q-buffers 120 and 121 act as switches, wherein when disabled the signals coupled to the Q-buffers 120–121 are tri-stated allowing the notebook computer 10 to be removed from the docking station 11.

The PCI clock line 181 and the REQ/GNT# lines 187 are run through the separate Q-buffer 121 so that during the docking sequence, the docking station 11 may take control of the PCI bus 180 before the PCI Q-buffer 120 is enabled. This will be explained in more detail herein below.

For one embodiment, the PCI clock on line 181 is a point-to-point signal from its source, such as memory controller and bridge chip 113 or a clocking chip (not shown), coupled to the docking connector 12. Moreover, the PCI clock on line 181 has a low skew relationship to the clock running on the primary notebook PCI bus 180.

In one embodiment, docking station 11 has a power supply 150 which powers all the devices in docking station 11. This type of docking station 11 resembles a desktop computer, in that the power supply 150 operates from an A.C. power source (not shown). Moreover, for one embodiment the power states of the docking station 11 and notebook computer 10 are independent of each other. Therefore, for instance, docking station 11 may be in a powered on state while notebook computer 10 is in a suspend state.

The suspend mode is a power saving state that allows the notebook computer 10 or docking station 11 to consume considerably less power at times when the system is not being used. There are a number of suspend modes that may be implemented within either the docking station 11 or notebook computer 10. For instance, the "powered-on suspend" mode disables all of the clocks in the system, except for the real time clock (RTC). The power consumed in this state is only the leakage power within the system. To resume from the powered-on suspend mode, the clocks are simply restarted.

The "suspend to DRAM" mode turns power off to all devices except power management logic, memory refresh logic, and frame buffer refresh logic. The context of each of the devices within the system must be saved to DRAM prior to invoking the suspend to DRAM mode. To resume from the suspend to DRAM mode, all devices must be reset and the context of each device restored.

The "suspend to disk" mode saves the entire context of the computer system to nonvolatile memory (e.g. the hard disk) and turns off power to the entire system. When the suspend to disk mode is exited, all of the devices within the computer system must be repowered, reset, and restored with the context saved on hard disk.

As mentioned previously, for one embodiment the notebook computer 10 and docking station 11 may invoke independent power modes. Thus, either the notebook computer 10 or the docking station 11 may enter one of the suspend modes at any time.

In another embodiment, docking station 11 is a mobile-type of docking station, wherein the docking station power supply 150 operates from the notebook computer power supply 160 or its own internal battery (not shown). For this type of docking station, the power mode of the docking station 11 follows that of the notebook computer 10. Therefore, when the notebook computer power supply 160 is on, the docking power supply 150 is on as well. When the notebook computer 10 is in a suspend mode, then the docking station 11 is in a suspend mode as well.

For the desktop type of docking station, the docking station power supply 150 may power a pin on connector 12, which the notebook computer 10 uses to charge the notebook battery (not shown) when the notebook computer 10 is seated within the docking station 11.

For one embodiment, the docking station 11 is capable of docking to either a notebook computer 10 running on 3.3 volts, or 5 volts. For this embodiment, the docking station power supply 150 supplies 5 volts (DS_VCC on line 189) to the components within the docking station. The docking station power supply 150 also converts the 5 volt signal to a 3.3 volt signal (QVCC on line 188), if needed, for interfacing with the notebook computer 10. The docking station power supply 150 further supplies a signal on line 191, indicating that the docking station power is within acceptable tolerances, and a signal on line 192 to the docking chip 130, indicating that the notebook computer power is within acceptable tolerances. The docking station power supply 150 will be discussed in more detail herein below, with reference to FIGS. 4a and 4b.

The docking connector 12 provides for a connection between the notebook computer 10 and the docking station 11. The docking connector 12 includes a number of pins that are used to provide for communication between notebook computer 10 and docking station 11. The signal lines within the docking station 11 illustrated in FIG. 1 will be discussed in more detail herein below with reference to the docking connector 12, the docking chip 130, and the docking power supply 150.

Figure 2:
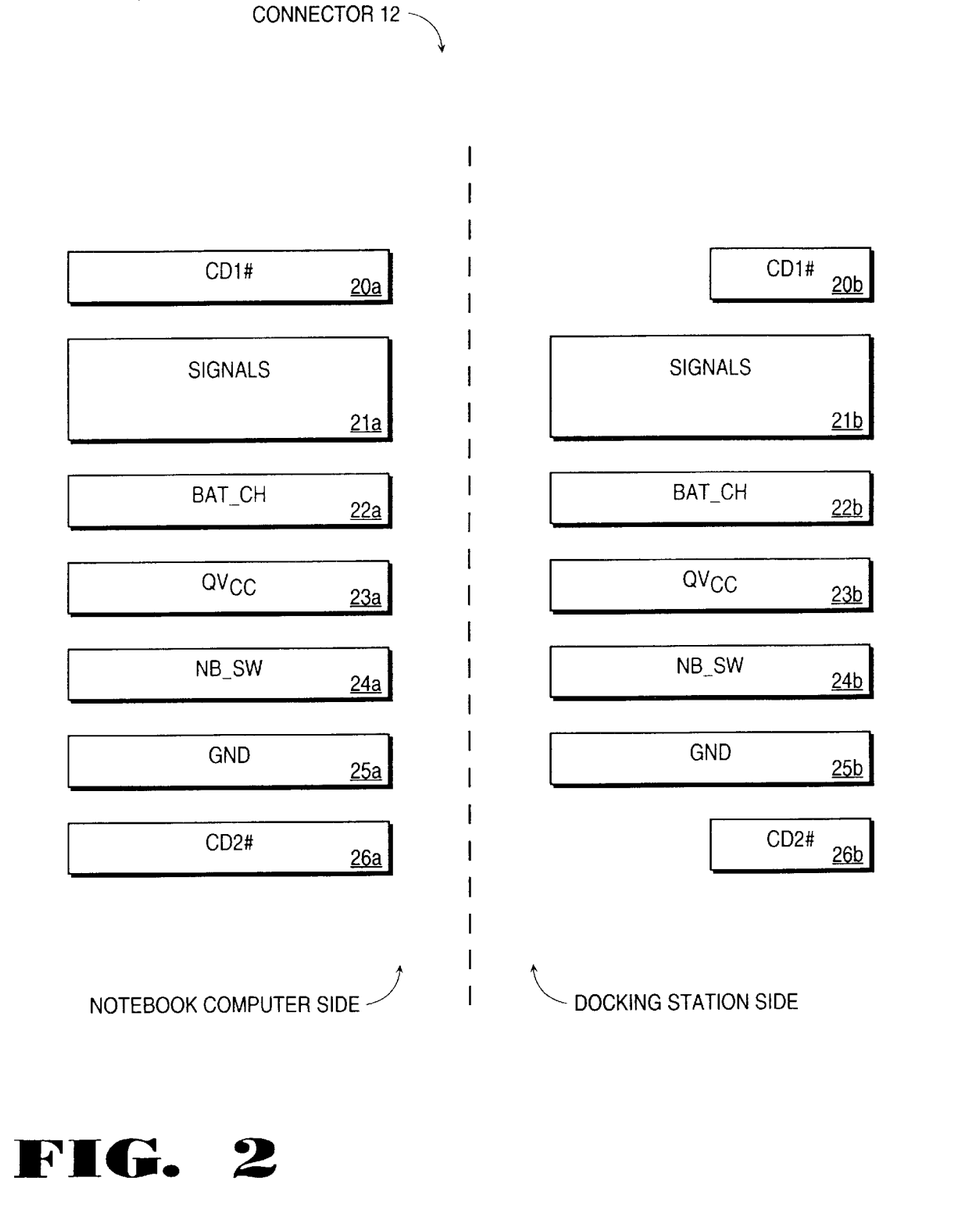
FIG. 2 illustrates one embodiment of a docking station connector of the present invention.

FIG. 2 illustrates one embodiment of docking connector 12 where the notebook computer side of the docking connector 12 comprises a female type connector and the docking station side of docking connector 12 comprises a male type connector. It should be appreciated that any well-known connector type may be used to implement connector 12 without departing from the scope of the invention. Moreover, the notebook computer side of docking connector 12 may comprise pins and the docking station side of the docking connector may comprise sockets.

The pins 20b–26b and sockets 20a–26a included in the connector are used to couple signals between the notebook computer and docking station. The CD1# pin 20b and CD2# pin 26b are connector detect pins. The connector detect pins are used to detect when the notebook computer has been properly inserted within the docking station. The "#" indicates an active low signal.

The position of the connector detect pins at either end of the docking connector 12 facilitates this detection. When both the CD1# 20b and CD2# 26b pins on the docking station side have been properly inserted within the sockets 20a and 26a on the notebook computer side, then a connection detect event is generated. This event signals to the docking chip 130 that the notebook computer is seated within the docking station.

Note that for one embodiment, the CD1# 20b and CD2# 26b pins on the docking station side are shorter than the other pins. This is another feature that facilitates a proper generation of the connector detect event. Due to the shorter length of the CD1# 20a and CD2# 26a pins, they will only be inserted within sockets 20a and 26a once the longer pins 21b–25b have all been inserted within sockets 21a–25a. Thus, the connector detect event will be generated once all of the pins 20a–26a have been inserted within sockets 20a–26a. As an alternative embodiment wherein the docking station side comprises a socket type connection, the CD1# 20b and CD2# 26b signals on the docking station side comprise shorter sockets, rather than pins. It should be appreciated that alternate embodiments of the present invention include a connector 12 with more or less connection detect signals, comprising pins or sockets of any length relative to the other signal pins and sockets. Moreover, an alternative embodiment includes other ways of detecting insertion such as a switch which is opened and closed when the mating parts of the connector are in proper registry.

The longer pins 21b–25b illustrate the other signals that are coupled between the notebook computer 10 and docking station 11. The GND connection 25a–b represents the ground plane used by both the notebook computer 10 and docking station 11. For one embodiment, it is ensured that the GND pin 25b is always inserted within socket 25a before any of the other pins. Thus, the ground plane is established before any other signals are connected, protecting the system against electro-static discharge (ESD).

The NB_SW signal line 24a–b connects a 5 volt power signal from the notebook computer 10 to the docking station 11. This 5 volt power signal is then routed to the docking power supply 150, for the second type of docking station power supply, wherein the docking station relies on the notebook computer for power.

The QVCC connection 23a–b is the bias voltage signal line for the Q buffers 120 and 121 within the notebook computer 10. The QVCC signal comes from the power supply 150 within the docking station 11, is routed through the connector 12 on pin 23b, and is delivered to Q buffers 120–121.

The battery charge (BAT_CH) connection 22a–22b is a battery charge signal line that is delivered from the docking station power supply 150 to charge the notebook battery 170.

The other signals 21a–b represent the bus and logic signals that are coupled between the notebook computer 10 and docking station 11. For instance, the PCI bus 180 is coupled between the notebook computer and docking station. Thus, a number of PCI signals are routed through the connector 12. For one embodiment, the PCI signals that are run through the connector 12 include the well-known signals: CLK, CLKRUN#, RST#, AD[31:0], C/BE[3:0]#, PAR, FRAME#, IRDY#, TRDY#, STOP#, LOCK#, DEVSEL#, pREQ#, pGNT#, PCPCI REQA#, PCPCI GNTA#, PERR#, SERR#, and INTA[A:D]#.

For an embodiment wherein the notebook computer 10 includes an ISA bus, the ISA signals are similarly routed through the connector 12. The ISA support signals include the defined ISA IRQs.

For one embodiment, six docking management signals are routed through the connector 12. These signals include NBPWRGD, the notebook "power good" signal. This signal indicates that the 5 volt power within the notebook computer is within acceptable tolerances. The SUS# signal indicates that the notebook computer is suspended and that the 5 volt power is within acceptable tolerances on the docking station side. The QDEN# and QPCIEN# signals are used to enable the Q-buffers 120 and 121 on the notebook computer 10. The DCKINTR# is a docking station interrupt that is used to signal a docking event, and the SRBTN# signal is generated by the docking chip 130 to resume the notebook computer 10 from a suspend mode.

The docking station connector 12 also includes a number of pins for passive wire signals that are used to facilitate communication between input and output devices. For instance, the LPT and COM port signals are routed through the connector 12. Moreover, the keyboard, mouse, floppy drive, cathode ray tube (CRT), phone, microphone, and speaker signals, if required, are routed through the connector 12. It should be appreciated that docking connector 12 may be implemented with more or fewer signals than those mentioned herein, in any combination, without departing from the scope of the invention.

Figure 3:
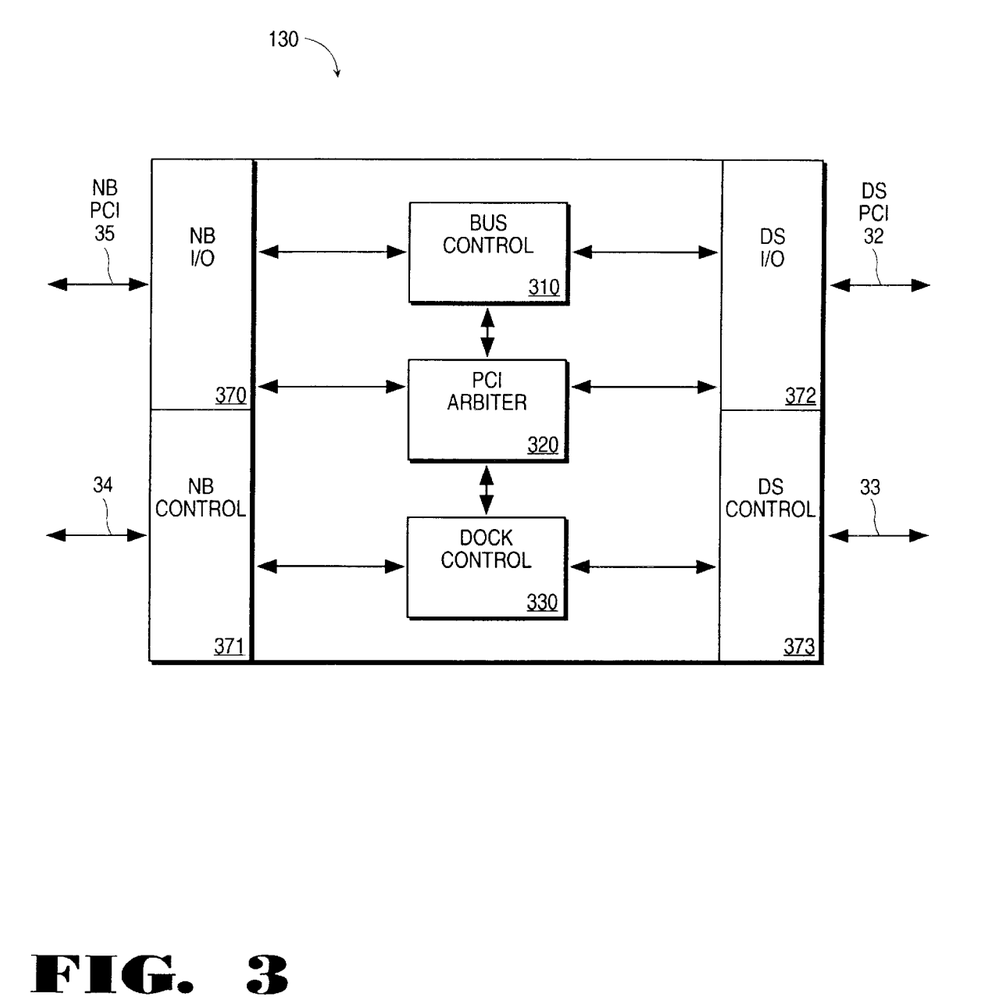
FIG. 3 illustrates a docking interface chip in accordance with one embodiment of the present invention.

FIG. 3 illustrates one embodiment of docking chip 130 within the docking station 11. The docking chip 130 comprises interface circuitry, used to facilitate non-preconditioned ("quiet") docking between the notebook computer 10 and the docking station 11. As was mentioned previously, prior art quiet docking systems placed the interface circuitry within the notebook computer 10 rather than the docking station 11.

The docking chip includes four input/output (I/O) rings 370–373 on the perimeter of the chip. These I/O rings 370–373 include buffer pads for interfacing with the I/O signal lines coupled to the docking chip 130. For another embodiment, the I/O rings 370–373 also include isolation logic for interfacing 3.3 volt and 5 volt signals. Additionally, I/O rings 370–373 may include test logic such as scan chains. The design of I/O buffers, isolation logic, and scan chains is well-known in the art and therefore is not discussed in detail.

The notebook I/O ring 370 is responsible for interfacing with the PCI bus signals that are coupled to the notebook computer 10 through connector 12. The notebook control I/O ring 371 interfaces the control signals to the notebook computer 10 through the connector 12. The docking station I/O ring 372 interfaces with the docking station bus 32, which for one embodiment comprises a PCI bus. The docking station control I/O ring 373 interfaces with the docking station control signals.

The bus control circuitry 310 acts as a bridge for interfacing between the docking station bus and the notebook computer bus. For one embodiment, the docking station bus 32 and the notebook computer bus 35 are both PCI buses. Therefore, the bus control circuitry 310 operates as a PCI-to-PCI bus bridge, interfacing the primary PCI bus 35 of notebook computer 10 to secondary PCI bus 32 of docking station 11. Each transaction that takes place on either the primary PCI bus 35 or the secondary PCI bus 32 is mirrored on the other bus by the bus control circuitry 310.

Moreover, for another embodiment, the docking chip 130 is capable of interfacing a primary PCI bus 35 with a secondary ISA bus. In such a case, bus control circuitry 310 additionally contains all the necessary logic to perform PCI-to-ISA translation.

The PCI arbiter logic 320 provides for additional PCI-to-PCI or PCI-to-ISA bridge functions. For one embodiment, the arbiter 320 services four PCI request/grant pairs to support four different PCI devices coupled to the docking station PCI bus 32.

The dock control circuitry 330 is responsible for controlling all docking, undocking, and suspend/resume sequences for interfacing the docking station 11 with the notebook computer 10. These sequences will be described in more detail herein below with reference to FIGS. 5 and 6.

Figure 4A:
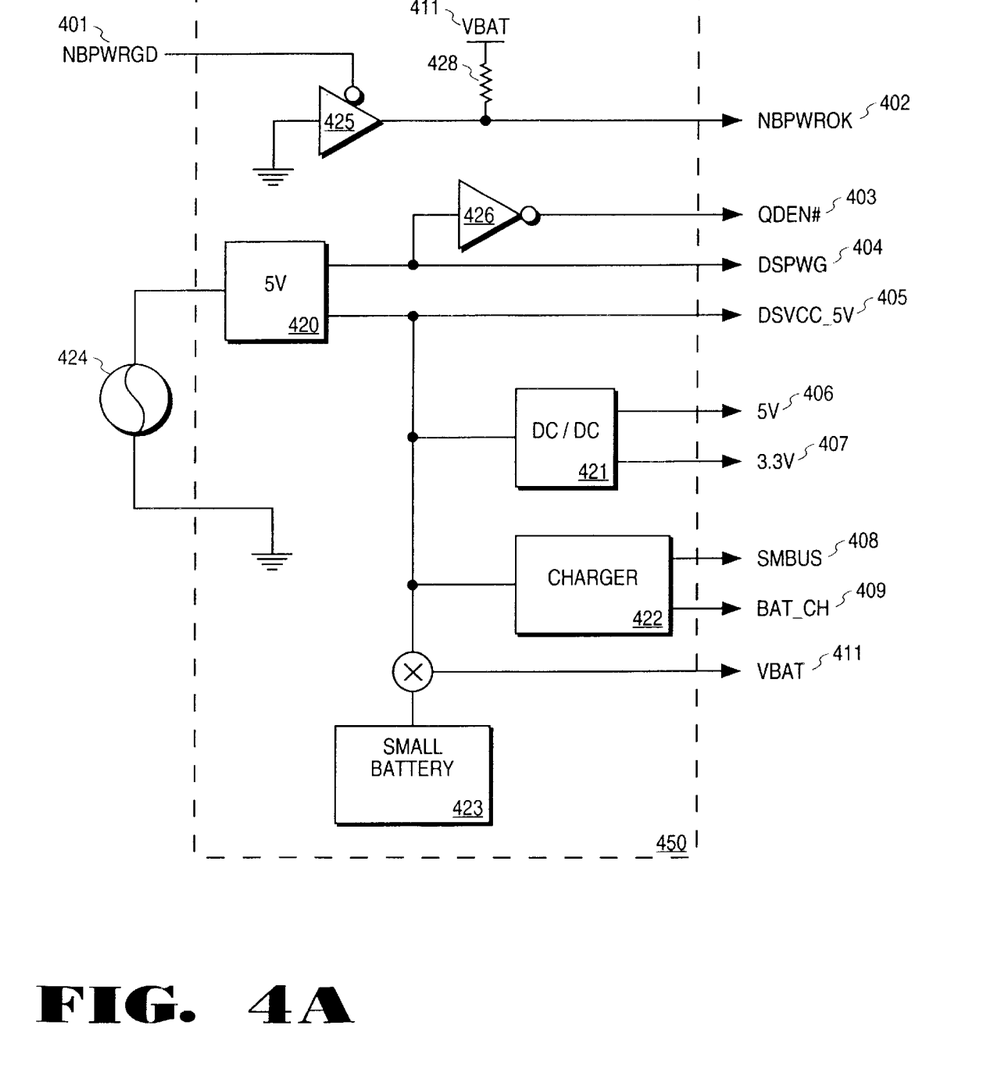
FIG. 4a illustrates a first embodiment of a docking station power supply in accordance with the present invention.

FIG. 4a illustrates a first embodiment of the docking station power supply 150. The embodiment shown in FIG. 4a is of a first type, wherein the docking station power mode is independent of the notebook computer power mode. The signal NBPWROK 402 (NB 192 of FIG. 1) indicates to the docking chip 130 that the notebook computer power supply is enabled. The NBPWROK signal 402 is generated from the NBPWRGD signal 401 (NBPWRGD 194 of FIG. 1), which is driven by the notebook computer power supply 160 when the notebook power is valid. The NBPWROK signal 402 is generated by converting the NBPWRGD signal 401 to an open drain signal through the buffer 425. The signal is then pulled up to the battery voltage VBAT 411 through a pull up resistor 428. Thus, when the notebook computer is docked and the notebook computer power is off, the NBPWROK signal 402 is pulled to the voltage level of the battery, VBAT 411.

The A.C. power signal 424 is coupled to the docking station power supply circuitry 450. The signal is then coupled to a 5 volt linear supply 420. The 5 volt linear supply 420 is used to generate the docking station power good signal DSPWG 404, which indicates the docking chip 130 that the docking station power is within acceptable tolerances (DS 191 of FIG. 1). The 5 volt power supply 420 is also used to generate the main 5 volt source for the docking station components, DSVCC_5V 405 (DSVCC 189 of FIG. 1). The docking station also has a DC/DC converter 421 that is used to generate the bias voltages for the Q buffers (QVCC 188 of FIG. 1). Both a 5 volt bias voltage 406 and a 3.3 volt bias voltage 407 are generated in order to provide support for a 5 volt or 3.3 volt notebook computer.

The docking station power circuitry 450 also contains its own small battery 423, which provides a battery voltage VBAT 411, used to power docking station control circuit 330. This small battery is used whenever the docking station loses its main source of power, DSVCC_5V, such that the docking station control circuit 330 can continue to operate.

The charger 422 is used to provide a battery charge signal BAT_CH 409 (BAT_CH 190 of FIG. 1) to charge the notebook computer battery when the notebook computer is docked within the docking station. For one embodiment wherein smart batteries are used, the charger 422 also supplies the SMBUS 408 to the smart batteries.

The power supply circuitry 450 is also used to generate the enable signal QDEN# 403 for Q-buffer 121 (QDEN# 193 of FIG. 1). The Q-buffer enable signal 403 is generated by inverting the DSPWG voltage of the 5v power supply 420 through inverter 426.

Figure 4B:
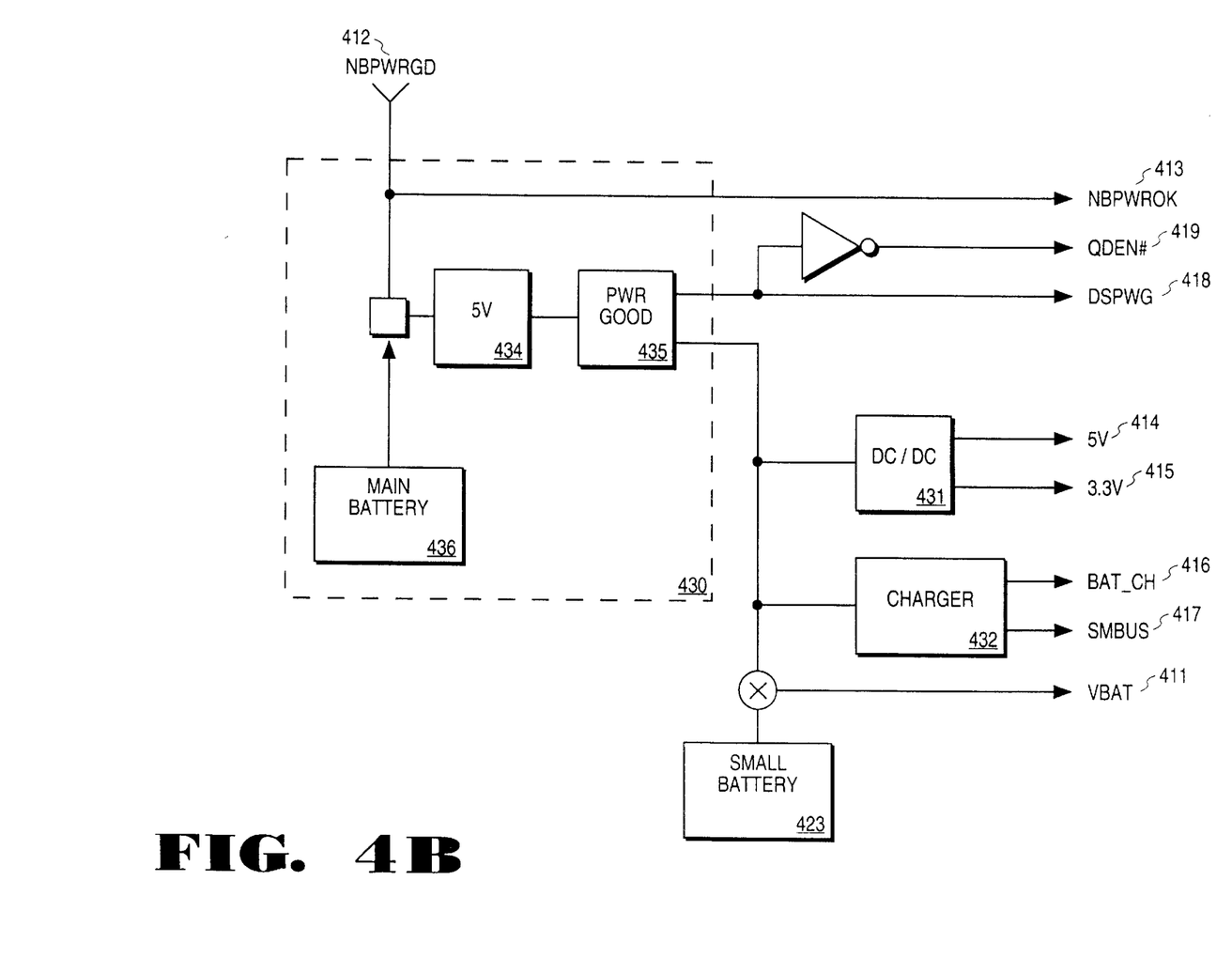
FIG. 4b illustrates a second embodiment of a docking station power supply in accordance with the present invention.

FIG. 4b illustrates an embodiment of the docking station power supply circuitry 150, wherein the docking station is of a second type, that is where the notebook computer and docking station are concurrently in the same power mode.

The notebook power good NBPWRGD signal 412 is used to generate the notebook power ok signal NBPWROK 413. The NBPWRGD signal 412 is also used as an enable for a switch, coupling the output of the main battery 436 to the 5v linear supply 434.

For the embodiment shown in FIG. 4b, the main battery 436 supplies the voltage that is fed to the 5 volt linear supply 434. The output of the 5 volt linear supply 434 is then fed to power good logic 435, which ensures that the 5 volt signal is valid. The power good logic 435 generates the docking station power good signal DSPWG 418, which is also used to generate the Q-buffer enable signal QDEN# 419. The 5 volt signal from the power good logic 435 is then fed to a DC/DC converter, which generates the 5 volt bias voltage 414 and the 3 volt bias voltage 415.

Similarly to the power circuitry of FIG. 4a, the embodiment of FIG. 4b includes a small battery 433 and a battery charger 432.

Note that the power supply circuit of FIG. 4b requires that the docking station have its own main battery supply 436. As an alternative embodiment, the power supply circuit of FIG. 4b may be implemented such that the main power source comes from the notebook power supply 160.

For this embodiment wherein the main power comes from the notebook computer, the supply circuitry 430 (separated by a dashed line) is removed from the power circuit. The 5 volt input to the DC/DC converter 431 does not come from the power good circuitry 435, but instead comes from the notebook computer power supply 160. The NBPWRGD signal 412 is used to generate both the DSPWG signal 418 and the QDEN# signal 419. For this embodiment, the charger 432 is optional and may comprise a charging circuit that can plug into a power source such as a cigarette lighter or an auxiliary DC power source.

It should be appreciated that the particular embodiments of the docking power supply 150, described above, may be substituted with other well-known power supply designs without departing from the scope of the invention.

Because notebook computers generally run on a portable power source, such as a battery, power consumption is an important parameter to consider in designing a notebook computer. As was discussed herein above, notebook computers and docking stations employ power saving modes designed to minimize the amount of power consumed at times when the computer is idle. The interface between these power saving modes, and the interface to control docking and undocking sequences, is located within docking control circuitry 330 of FIG. 3.

Figure 5:
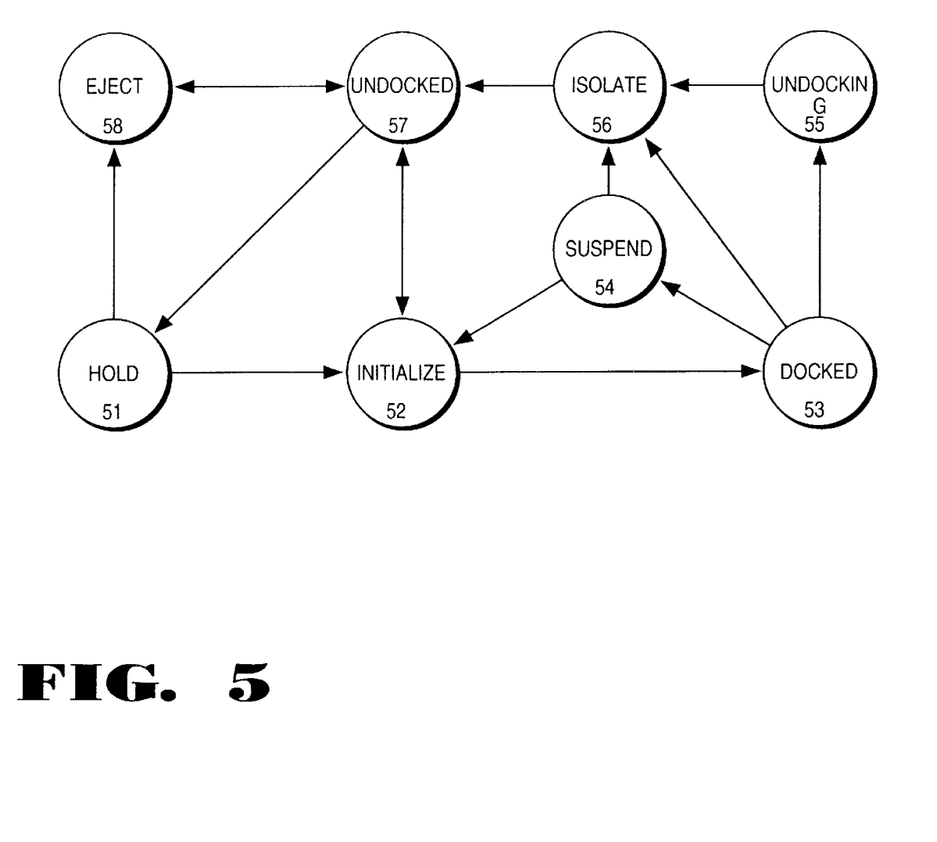
FIG. 5 illustrates a state diagram of a docking state machine in accordance with one embodiment of the invention.

For one embodiment, the docking control circuitry 330 includes circuitry implementing the docking state logic for handling the power-saving and docking/undocking events. FIG. 5 illustrates one embodiment of a state diagram for the docking control circuit 330. Ordinary logic circuits may be used to implement this state machine.

The undocked state 57 indicates that the notebook computer is not docked to the docking station. Additionally, if the docking station is of the first type, such that the power supply is independent of the notebook power supply, then the undocked state 57 indicates that either the notebook computer or the docking station is powered off. Once the notebook computer is inserted into the docking station, indicated by the assertion of both the CD1# and CD2# signals, the docking state machine starts in the undocked state 57.

Whenever the undocked state 57 is entered from another state, the circuitry 330 isolates the primary (notebook computer) PCI bus from the secondary (docking station) PCI bus. The circuitry 330 turns off the PCI Q-buffer 121 of FIG. 1 by deasserting the QPCIEN# signal 183, and asserts a secondary PCI bus reset signal, sRST#, on the docking station PCI bus.

For one embodiment, the circuitry 330 enters the undocked state 57 whenever either the CD1# or CD2# signals is deasserted. This is considered an unexpected ejection of the notebook computer from the docking station. The docking station chip 130 then isolates the PCI bus without affecting PCI transactions, as is described in more detail with reference to FIG. 7.

Moreover, for one embodiment of the invention, the notebook computer must be unlocked or ejected in order to be removed from the docking station. Thus, for this embodiment, the unlock or eject mechanism is signaled when the state machine is in the undocked state 57, so that the notebook computer may be unlocked or ejected.

The circuitry 330 transitions to the hold state 51 if it is determined that a suspended notebook computer is seated within a second (dependent-power) type of docking station, or the suspended notebook computer is seated within a first (independent power) type of docking station that is powered.

The circuitry 330 transitions from the undocked state 57 to the initialize state 52 if a powered up notebook computer is inserted in to a powered on docking station of the first type.

The hold state 51 prepares a suspended notebook computer for entering the initialize state by resuming power in the notebook computer by pulsing a resume signal. Once the notebook computer power is determined to be good, by an assertion of the NBPWROK signal, the state machine transitions to the initialize state.

For one embodiment, the docking station includes an open request button, accessible by the user of the system, that asserts the OPENREQ signal when pushed. This signal is routed to the state machine, indicating that the user desires to remove the notebook computer. If the OPENREQ signal is asserted while the state machine is in the hold state 51, then the circuitry 330 transitions to the eject state 58 to undock the notebook computer.

The initialize state 52 may be entered whenever the docking station and notebook computer are both powered on and the notebook is docked. The initialize state 52 prepares the docked notebook computer to enter the docked state 53 by performing a quiet dock sequence. The quiet dock sequence begins with the step of turning on the bias voltages by asserting a signal to the docking power supply logic 150 of FIG. 1. The PCI clock Q-buffer 121 is then enabled. Thereafter the circuitry 330 requests control of the notebook PCI bus, and once control is granted, the circuitry 330 enables the PCI Q-buffer 120 by asserting the QPCIEN# 183 signal.

Upon insertion of the notebook computer into the docking station, a software routine checks the docking station's identification number that is stored within memory, such as an electrically erasable programmable read only memory (EEPROM). If it is determined that the notebook computer has not previously been coupled to this particular docking station, then the software polls the hardware devices of the docking station and then loads the needed software drivers. If the drivers are not available, the software prompts the user for them. The notebook computer then stores the docking station's identification number so that the next time it is inserted in this docking station that it contains all of the necessary drivers.

The docked state 53 is entered from the initialize state once the notebook computer has been initialized and the notebook computer power is on. The circuitry 330 will then enter either the suspend state 54, the isolate state 56, or the undocking state 55.

The circuitry 330 transitions to the suspend state 54 if the notebook computer enters one of the suspend modes. The circuitry 330 enters the isolate state 56 if either the notebook computer or the docking station is turned off. The docking state machine enters the undocking state 55 if a software routine indicates that an undocking sequence is desired.

The suspend state 54 represents one of two suspend states the docking circuitry 330 may enter: the powered on suspend and the powered off suspend. The powered on suspend state of the docking state machine is used in conjunction with the powered on suspend mode of the notebook computer. The powered off suspend state is used with any one of the three notebook suspend modes described herein above, e.g., powered on suspend, suspend to DRAM, suspend to disk.

The docking station stays in the docked state 53 when the notebook computer enters the powered on version of the suspend mode. When the powered off suspend version of the suspend state 54 is entered, the docking station is powered off. Prior to powering off the docking station, the system software saves the context of the docking station devices. The docking state machine disables the PCI Q-buffer 120 of FIG. 1 and turns off the Q-buffer bias voltage QVCC 188 and waits until the notebook computer resumes.

The undocking state 55 is entered when it is time to undock the notebook computer from the docking station. Prior to entering the undocking state 55, a software routine should have informed the operating system to shut down any applications that are using docking station resources. Once the operating system has completed this process, a software routine indicates to the circuitry 330 that the undocking sequence is desired. The isolate state 56 is then entered. The circuitry 330 deasserts QPCIEN# 183, which disables Q-buffer 120. This isolates the PCI bus without disturbing current transactions, as further explained with reference to FIG. 7.

The circuitry 330 then generates an OPEN signal that indicates to an eject or unlocking mechanism to eject or unlock the notebook computer from the docking connector. Once the pulse is generated, the circuitry 330 transitions to the isolate state 56.

The eject state 58 is used whenever a powered-off notebook computer is connected to a powered-on docking station. The user of the system may press an eject button, which pulses an OPENREQ signal to the circuitry 330. The circuitry 330 then enters the eject state 58, wherein the OPEN pulse is generated to eject or unlock the notebook computer from the docking station.

While the circuitry 330 of FIG. 5 has been described with reference to particular power modes, signal names, and circuit components, it should be appreciated that other well-known modes, signals, and circuits may be substituted therefor without departing from the scope of the invention. For instance, a docking station without an eject or locking mechanism for holding the notebook computer in place would not require the generation of an OPEN pulse.

For one embodiment, the state machine illustrated in FIG. 5 is implemented as a programmable logic array (PLA) within the circuitry 330. Alternatively, the state machine may be implemented in another form of circuitry well-known to those skilled in the art, such as combinational logic.

Detailed Description of the Method of the Present Invention

Figure 6:
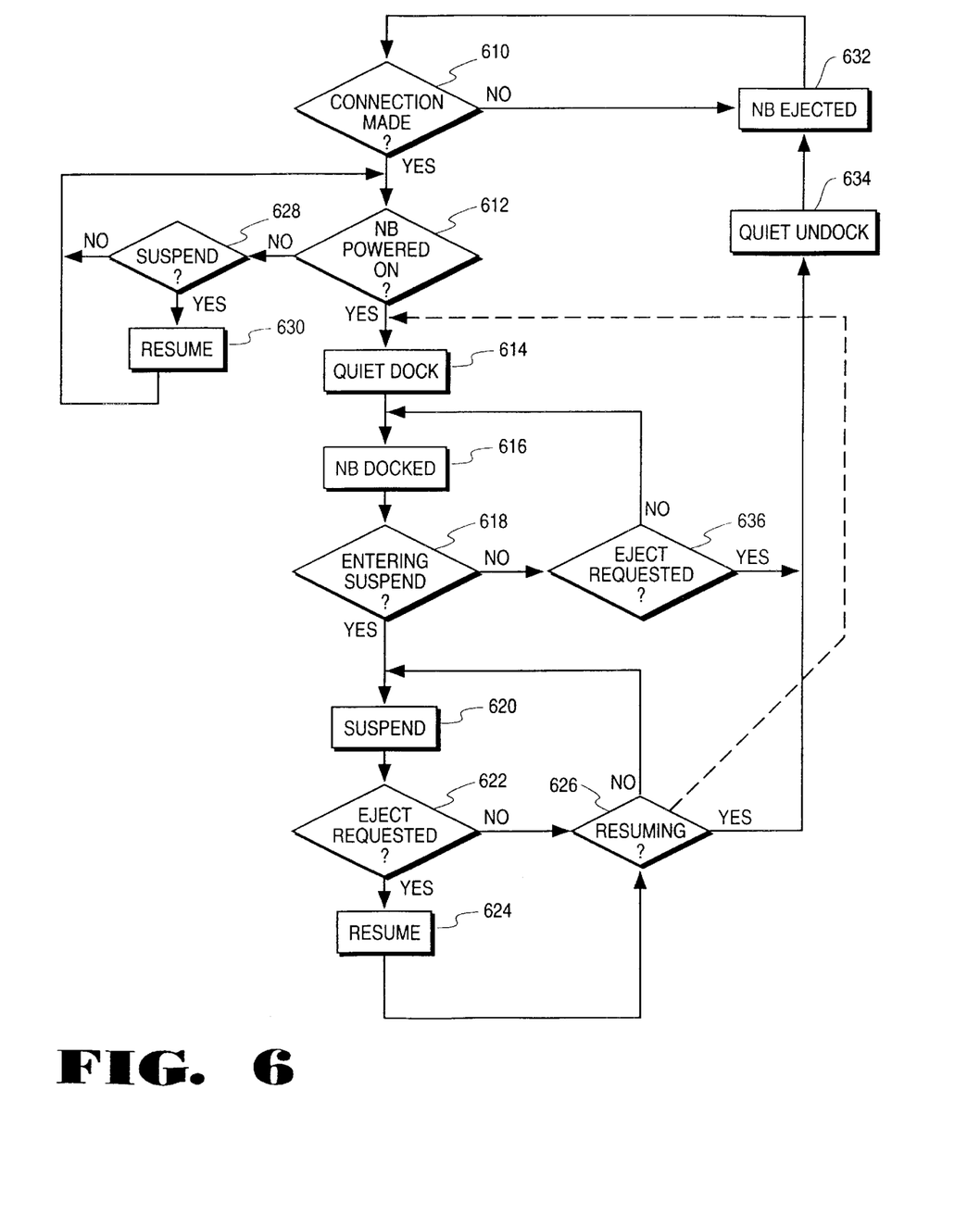
FIG. 6 is a flow diagram depicting a method of handling docking and undocking of a notebook computer.

FIG. 6 is an illustration of a method of docking and undocking a notebook computer to and from the docking station. The method of FIG. 6 will be explained with reference to components illustrated in FIG. 1.

The first step 610 illustrates the insertion of the notebook computer 10 within the docking station 11. If the connection is made properly, both the CD1# and CD2# signals within the connector 12 will be asserted. The method then transitions to step 612. If the notebook computer 10 is not inserted within the docking station 11, then the method transitions to step 632, which indicates that the notebook computer 10 has been ejected or is not seated properly within the docking station. The system stays at step 632 until a connection is detected at step 610.

Step 612 illustrates that once the notebook computer has been inserted within the docking station 11, the docking station 11 must then determine whether the notebook computer 10 is powered on. When the NBPWROK signal 402 of FIG. 4 is asserted, then the notebook computer 10 is powered on. The method then transitions to step 614. When the NBPWROK signal 402 is deasserted, step 628 illustrates that the docking station 11 determines whether the notebook computer 10 is in the suspend state. This is indicated by an assertion of the SUS# signal 186 that is routed through the docking station connector 12.

If the notebook computer 10 is suspended, then the notebook computer 10 is resumed by the docking station 11 at step 630 before the docking sequence is continued. The docking station 11 resumes the notebook computer 10 by asserting the SRBTN# signal 184, which is routed through the docking station connector 12. Thereafter, when step 612 is performed once again, it should be determined that the notebook computer 10 power is on.

At step 614, the quiet dock procedure is performed. The quiet dock procedure was described above with reference to FIG. 5, and includes the steps of turning on the bias voltages, enabling the PCI clock Q buffer 121, and enabling the PCI Q-buffer 120. The docking chip 130 then generates an interrupt (DCKINTR 182 of FIG. 1) that indicates to the system software that the quiet dock procedure of step 614 has completed. In response to the DCKINTR 182 signal, the computer system is configured by loading required drivers for devices on the docking station 11, if this is the first time the notebook computer 10 is inserted in this particular docking station 11.

The notebook computer 10 and docking station 11 then remain operational and powered up, as is indicated by step 616. At step 618, the docking chip 130 monitors the state of the SUS# signal 186 to detect whether the notebook computer is entering a suspend mode.

If the SUS# 186 signal does not indicate that the notebook computer is entering suspend mode, step 636 illustrates that the docking chip 130 checks to see if an eject request has been indicated. An eject request is a request by a software routine to undock the notebook computer from the docking station, and was described in detail herein above. For one embodiment of the invention, the user of the computer system may press an undock button to initiate the undock sequence. This causes step 636 to be performed, and is indicated by an OPENREQ signal.

If an eject is requested, then the quiet undock sequence is performed at step 634. As was described above, the quiet undock sequence includes the steps of shutting down applications that use docking station resources, isolating the notebook PCI bus from the docking station PCI bus, and unlocking or ejecting the notebook computer from the docking station connector 12.

Step 632 illustrates that the docking station 11 waits for a notebook computer to be inserted.

Back at step 618, if it was determined that the notebook computer was entering a suspend mode rather than being ejected, then step 620 is performed. At step 620, the notebook computer 10 and the docking station 11 enter a suspend mode. The notebook computer 10 and docking station 11 will be taken out of suspend mode if an eject is requested or a resume event is detected. If a resume event is detected and no eject is requested, the circuitry 330 performs the quiet docking sequence and proceeds to step 616 via step 614 (shown by dashed line).

If it is determined that an eject is requested while the notebook computer 10 and docking station 11 are in suspend mode, as is indicated by step 622, then the notebook computer 10 is resumed at step 624 before the quiet undock sequence is performed. The notebook computer 10 is resumed by an assertion of the SRBTN# signal 184 by the docking chip 130. If no eject is requested at step 622, then the notebook computer 10 will remain in the suspend mode until it is resumed.

It is determined at step 626 whether the notebook computer 10 has completed resuming. When the notebook computer has resumed power, the NBPWROK signal 192 will be asserted. Once the notebook computer 10 has resumed, the quiet undock sequence of step 634 is performed.

As was mentioned previously, the quiet undock sequence includes the step of isolating the primary notebook PCI bus from the secondary docking station PCI bus without interrupting a PCI transaction that may be in progress. Prior art undocking methods included the steps of requesting a transaction on the PCI bus, waiting for the transaction to be granted, and then allowing an isolation of the PCI bus when no transactions are taking place. For these methods, the bus is idle when it becomes isolated. Thus, the transactions are not affected by signal variations that may occur on the bus due to the change in load during isolation.

By contrast, the undocking method of the present invention does not require that the docking chip 130 request control of the PCI bus 180 before isolation. The method of the present invention allows for isolation before the predetermined PCI signal setup time as specified by the PCI Specification, version 2.1, available from the PCI Special Interest Group (SIG).

Figure 7:
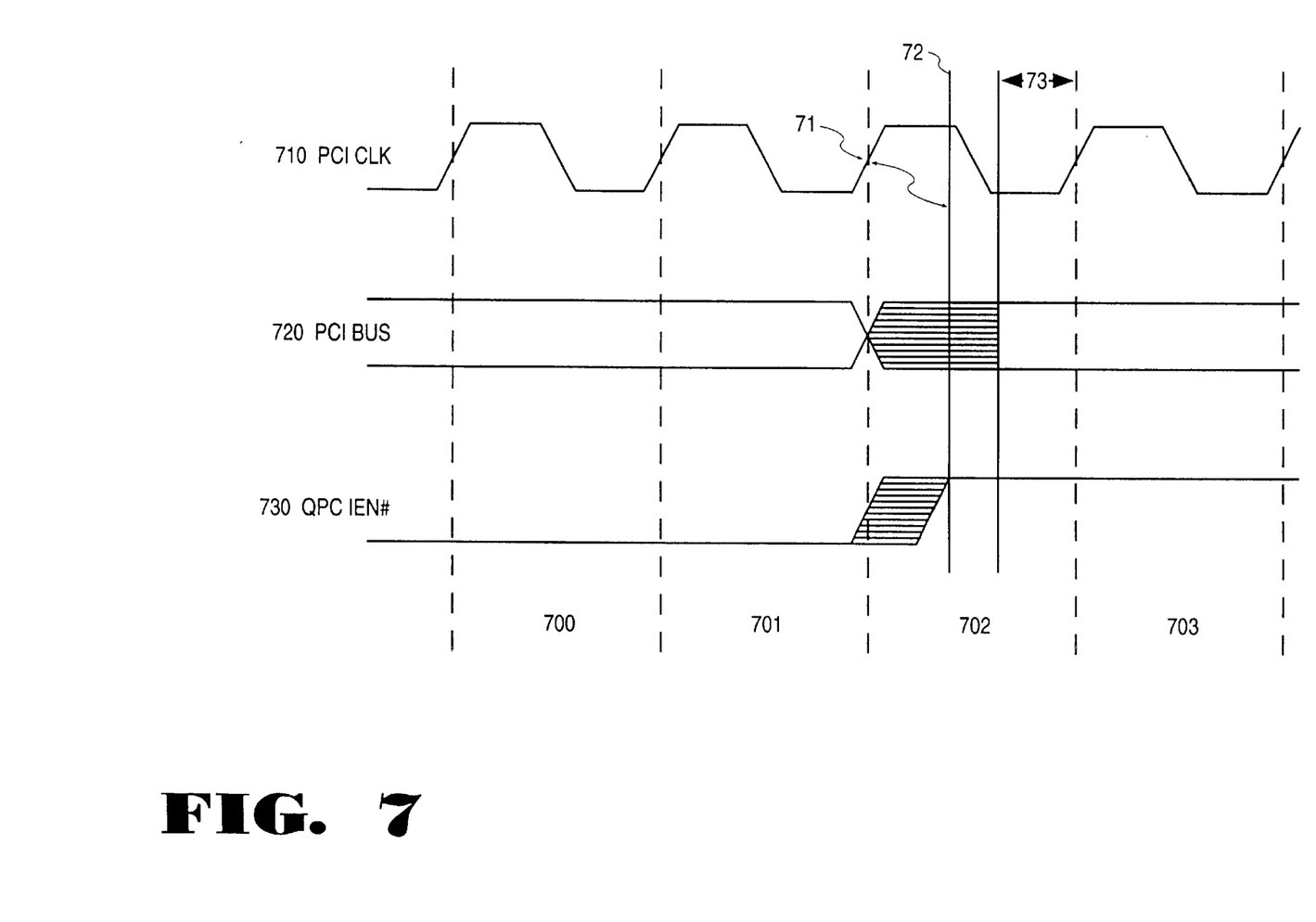
FIG. 7 is a timing diagram of signals asserted within one embodiment of the present invention.

The timing diagram of FIG. 7 illustrates one embodiment of the undocking signal protocol of the present invention. The signals illustrated are the PCI clock 710, the PCI bus 720, and the QPCIEN# signal 730. Recall that the QPCIEN# signal 730 enables and disables the PCI Q-buffer 120 of FIG. 1. Recall that when the Q-buffer 120 is disabled, the primary notebook PCI bus 180 is isolated from the secondary docking station PCI bus and the notebook computer 10 may be removed from the docking station 11.

At the time when the Q-buffer 120 is disabled, the primary notebook PCI bus will detect a much smaller load, since the PCI devices of the docking station will no longer be coupled to the primary PCI bus. Thus the signals on the notebook PCI bus may experience fluctuations in voltage due to the load change. This may cause a problem for any PCI transaction that is taking place on the notebook PCI bus. Thus, the present invention provides for a method of disabling the PCI Q-buffer 120 between the rising edge of the PCI clock and the beginning of the setup time for the next clock.

The undock mechanism of the present invention is controlled by the docking control circuitry 130 of FIG. 1. The docking control circuitry interfaces between the notebook computer and docking station to ensure that the QPCIEN# signal is asserted before the setup time on the PCI bus.

Referring to FIG. 7, four cycles 700–703 of the PCI clock 710 are illustrated. According to the PCI protocol, all signals are latched on the rising edge of the PCI clock, indicated by dashed lines. In order to be sure the correct signal values are latched at the rising edge, the signals must be at a stable value at the setup time, defined as an amount of time before the rising edge of the next clock.

The present invention ensures that the signals on the PCI bus 720 are stable by the setup time. The QPCIEN# signal 730 is deasserted at, or slightly after, the rising edge of the PCI clock at point 71. The shaded area between points 71 and 72 illustrates a valid delay time in which the QPCIEN# signal may be deasserted. The PCI Q-buffer 120 then becomes disabled sometime within the shaded region, but before point 73, which marks the beginning of the defined PCI setup time. The signals on the PCI bus 720 are therefore at a stable value by the rising edge of clock 703.

Therefore, a method and apparatus for quietly docking and undocking a notebook computer to and from a docking station has been described. While the embodiment of the docking station described herein has been designed to accommodate a single notebook computer, it should be appreciated that the docking station may alternately accommodate more than one notebook computer. For this alternate embodiment, the interface between the notebook computers and the docking station may reside within a single docking chip, such as docking chip 130 of FIG. 1, or several docking chips in accordance with the present invention.

While the method and apparatus of the present invention has been described in terms of its presently preferred form, those skilled in the art will recognize that the method of the present invention is not limited to the presently preferred form described. The method and apparatus of the present invention may be practiced with modification and alteration within the spirit and scope of the appended claims. Thus, the specification is to be considered as illustrative instead of restrictive on the present invention.

We claim:

1. An interface for providing quiet docking of a notebook computer to a docking station without preconditioning; said interface comprising:

circuitry, located within said docking station, that detects when said notebook computer has been inserted within said docking station, and correspondingly enables a switch such that a common system bus is coupled between said notebook computer and said docking station, and generates events to allow a software routine to configure the notebook computer and docking station without user intervention;

the circuitry further for detecting an eject request event and correspondingly isolating said common system bus between said notebook computer and said docking station such that a transaction taking place on said common system bus is not affected, wherein said circuitry isolates said common system bus by disabling said switch in a time between a rising edge of a first system bus clock and a setup time for the next system bus clock.

2. The interface of claim 1, wherein the circuitry generates request signals on said common system bus to take control of said common system bus before enabling said switch.

3. The interface of claim 1, wherein upon insertion of the notebook computer into the docking station, the circuitry generates a docking event that causes the software routine to retrieve software drivers corresponding to devices within said docking station coupled to said common system bus.

4. The interface of claim 1, wherein said circuitry further detects that the notebook computer has been removed from the docking station and correspondingly isolates said common system bus between said notebook computer and said docking station such that a transaction taking place on said common system bus is not affected.

5. A computer system, comprising:

(A) a notebook computer;

(B) a docking station, including (i) a docking connector that couples a plurality of common signals between the notebook computer and docking station when the notebook computer is inserted within the docking connector, wherein a set of common system bus signals of said plurality common signals are further coupled to a switch, and (ii) interface circuitry for detecting that the notebook computer has been inserted within the docking connector and correspondingly enabling said switch such that said common system bus signals are coupled between said notebook computer and docking station, and generating events to allow a software routine to configure the notebook computer and docking station without user intervention;

(iii) the interface circuitry further for detecting an eject request event and correspondingly isolating the common system bus signals between said notebook computer and said docking station, such that a transaction taking place on said system bus is not affected, by disabling said switch in a time between a rising edge of a first system bus clock and a setup time for the next system bus clock.

6. The computer system of claim 5, wherein said interface circuitry takes control of said system bus before enabling said switch.

7. The computer system of claim 5, wherein upon insertion of the notebook computer into the docking connector, the interface circuitry causes the software routine to retrieve software drivers corresponding to devices within said docking station coupled to said system bus.

8. The computer system of claim 5, wherein said interface circuitry further detects that the notebook computer has been removed from the docking connector and correspondingly isolates said common system bus signals between said notebook computer and said docking station such that a transaction taking place on said system bus is not affected.

9. A docking station, comprising:

(A) a docking connector that couples a plurality of common signals between a notebook computer and docking station when the notebook computer is inserted within the docking connector, wherein a set of common system bus signals of said plurality common signals are further coupled to a switch, and (B) interface circuitry for detecting that the notebook computer has been inserted within the docking connector and correspondingly enabling said switch such that said common system bus signals are coupled between said notebook computer and docking station, and generating events to allow a software routine to configure the notebook computer and docking station without user intervention;

(C) said interface circuitry further for detecting an eject request event and correspondingly isolating said common system bus signals between said notebook computer and said docking station by disabling said switch in a time between a rising edge of a first system bus clock and a setup time for the next system bus clock, such that a transaction taking place on said system bus is not affected.

10. The docking station of claim 9, wherein said interface circuitry takes control of said system bus before enabling said switch.

11. The docking station of claim 9, wherein upon insertion of the notebook computer into the docking connector, the interface circuitry causes the software routine to retrieve software drivers corresponding to devices within said docking station coupled to said system bus.

12. The docking station of claim 9, wherein said interface circuitry further detects that the notebook computer has been removed from the docking connector and correspondingly isolates said common system bus signals between said notebook computer and said docking station such that a transaction taking place on said system bus is not affected.

13. An interface for providing docking of a notebook computer to a docking station without preconditioning; said interface comprising:

circuitry, located within said docking station, that detects when said notebook computer has been inserted within said docking station, and correspondingly enables a switch such that a common system bus is coupled between said notebook computer and said docking station, and generates an event to cause a software routine to retrieve software drivers corresponding to devices within said docking station coupled to said common system bus without user intervention, wherein said circuitry further detects an undock event and correspondingly isolates said common system bus between said notebook computer and said docking station such that a transaction taking place on said common system bus is not affected;

wherein said circuitry isolates said common system bus by disabling said switch in a time between a rising edge of a first system bus clock and a setup time for the next system bus clock.

14. The interface of claim 13, wherein the circuitry generates request signals on said common system bus to take control of said common system bus before enabling said switch.

15. The interface of claim 13, wherein said undock event occurs when said notebook computer is removed from said docking station.

16. The interface of claim 13, wherein said undock event occurs when a user requests to eject the notebook computer.

* * * * *